United States Patent
Li et al.

(10) Patent No.: US 9,172,889 B2
(45) Date of Patent: Oct. 27, 2015

(54) IMAGING SYSTEMS AND METHODS FOR GENERATING AUTO-EXPOSED HIGH-DYNAMIC-RANGE IMAGES

(71) Applicant: Semiconductor Components Industries, LLC, Phoenix, AZ (US)

(72) Inventors: Huai Dong Li, Cupertino, CA (US); Peng Lin, Plesanton, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 162 days.

(21) Appl. No.: 13/755,988

(22) Filed: Jan. 31, 2013

(65) Prior Publication Data

US 2013/0208138 A1    Aug. 15, 2013

Related U.S. Application Data

(60) Provisional application No. 61/597,081, filed on Feb. 9, 2012.

(51) Int. Cl.
*H04N 5/235* (2006.01)
*H04N 5/355* (2011.01)

(52) U.S. Cl.
CPC .......... *H04N 5/2355* (2013.01); *H04N 5/2352* (2013.01); *H04N 5/2353* (2013.01); *H04N 5/35554* (2013.01); *H04N 5/35581* (2013.01)

(58) Field of Classification Search
CPC ... H04N 5/2355; H04N 5/3535; H04N 5/355; H04N 5/35536–5/35572; H04N 5/2352; H04N 5/2353; H04N 5/35581
USPC ........ 348/207.99, 207.1, 218.1, 222.1, 230.1, 348/241, 362–368; 345/589
See application file for complete search history.

(56) References Cited

U.S. PATENT DOCUMENTS

| | | | |
|---|---|---|---|
| 5,144,442 A | 9/1992 | Ginosar et al. | |
| 5,247,366 A | 9/1993 | Ginosar et al. | |

(Continued)

FOREIGN PATENT DOCUMENTS

| | | |
|---|---|---|
| EP | 2375383 | 12/2011 |
| EP | 2515273 | 10/2012 |

OTHER PUBLICATIONS

Huai Dong Li et al., U.S. Appl. No. 13/646,453, filed Oct. 5, 2012.

(Continued)

*Primary Examiner* — Dennis Hogue
(74) *Attorney, Agent, or Firm* — Treyz Law Group; Michael H. Lyons

(57) ABSTRACT

Electronic devices may have camera modules that include an image sensor and processing circuitry. The image sensor may capture an image from a scene. The processing circuitry may extract image statistics and exposure levels from the image. The processing circuitry may use the image statistics and the exposure levels to generate a first exposure time, a second exposure time, and gain settings for the image sensor. The image sensor may capture additional images from the scene having long-exposure image pixel values that are captured using the first exposure time and short-exposure image pixel values that are captured using the second exposure time. The processing circuitry may generate a long-exposure image and a short-exposure image from the second image. The processing circuitry may generate auto-exposed high-dynamic-range images of the scene using the long-exposure image and the short-exposure image.

14 Claims, 7 Drawing Sheets

(56) References Cited

U.S. PATENT DOCUMENTS

| | | | |
|---|---|---|---|
| 6,518,558 | B1 | 2/2003 | Bohm et al. |
| 7,084,905 | B1 | 8/2006 | Nayar et al. |
| 7,382,407 | B2 | 6/2008 | Cho et al. |
| 7,397,509 | B2 | 7/2008 | Krymski |
| 7,907,209 | B2 | 3/2011 | Au et al. |
| 7,911,518 | B2 | 3/2011 | Yosefin |
| 8,013,919 | B2 | 9/2011 | Yaffe et al. |
| 8,237,813 | B2 | 8/2012 | Garten |
| 8,279,328 | B2 | 10/2012 | Lahav et al. |
| 8,305,487 | B2 | 11/2012 | Cha et al. |
| 8,405,750 | B2 | 3/2013 | Smith et al. |
| 2002/0180875 | A1 | 12/2002 | Guisdash |
| 2003/0038296 | A1 | 2/2003 | Merrill |
| 2003/0103158 | A1 | 6/2003 | Barkan et al. |
| 2003/0169359 | A1 | 9/2003 | Merrill et al. |
| 2004/0189844 | A1 | 9/2004 | McCaffrey et al. |
| 2005/0045980 | A1 | 3/2005 | Guidash |
| 2005/0099504 | A1 | 5/2005 | Nayar et al. |
| 2005/0128327 | A1 | 6/2005 | Bencuya et al. |
| 2005/0167574 | A1 | 8/2005 | He et al. |
| 2005/0243177 | A1* | 11/2005 | Kang et al. ............... 348/207.1 |
| 2006/0145203 | A1 | 7/2006 | Toros et al. |
| 2006/0192867 | A1 | 8/2006 | Yosefin |
| 2007/0040922 | A1 | 2/2007 | McKee et al. |
| 2007/0285526 | A1 | 12/2007 | Mann et al. |
| 2008/0117305 | A1* | 5/2008 | Rogers et al. ............... 348/222.1 |
| 2008/0158398 | A1 | 7/2008 | Yaffe et al. |
| 2008/0219585 | A1 | 9/2008 | Kasai et al. |
| 2008/0267522 | A1 | 10/2008 | Kobayashi |
| 2009/0002525 | A1* | 1/2009 | Um et al. ....................... 348/241 |
| 2009/0021612 | A1 | 1/2009 | Hamilton et al. |
| 2009/0040349 | A1 | 2/2009 | Xu |
| 2009/0040364 | A1 | 2/2009 | Rubner |
| 2009/0135263 | A1* | 5/2009 | Sorek et al. ................ 348/218.1 |
| 2009/0256942 | A1 | 10/2009 | McCaffey et al. |
| 2009/0268063 | A1 | 10/2009 | Ellis-Monaghan et al. |
| 2009/0273696 | A1 | 11/2009 | Krymski |
| 2010/0259636 | A1* | 10/2010 | Tzur et al. .................. 348/222.1 |
| 2010/0309333 | A1* | 12/2010 | Smith et al. ................. 348/230.1 |
| 2011/0090365 | A1 | 4/2011 | Cha et al. |
| 2011/0096085 | A1* | 4/2011 | Cha et al. ....................... 345/589 |
| 2012/0236169 | A1 | 9/2012 | Choe et al. |
| 2012/0287294 | A1 | 11/2012 | Kaizu et al. |
| 2012/0328025 | A1 | 12/2012 | Chang et al. |

OTHER PUBLICATIONS

Huai Dong Li, U.S. Appl. No. 13/786,199, filed Mar. 5, 2013.

* cited by examiner

IMAGING SYSTEMS AND METHODS FOR GENERATING AUTO-EXPOSED HIGH-DYNAMIC-RANGE IMAGES

This application claims the benefit of provisional patent application No. 61/597,081, filed Feb. 9, 2012 which is hereby incorporated by reference herein in its entirety.

BACKGROUND

The present invention relates to imaging devices and, more particularly, to high-dynamic-range imaging systems.

Image sensors are commonly used in electronic devices such as cellular telephones, cameras, and computers to capture images. In a typical arrangement, an electronic device is provided with an image sensor having an array of image pixels and a corresponding lens. Some electronic devices use arrays of image sensors and arrays of corresponding lenses.

In certain applications, it may be desirable to capture high-dynamic range images. While highlight and shadow detail may be lost using a conventional image sensor, highlight and shadow detail may be retained using image sensors with high-dynamic-range imaging capabilities.

Common high-dynamic-range (HDR) imaging systems use multiple images that are captured by the image sensor, each image having a different exposure time. Captured short-exposure images may retain highlight detail while captured long-exposure images may retain shadow detail. In a typical device, image pixel values from short-exposure images and long-exposure images are selected to create an HDR image.

When capturing images from highly dynamic scenes (i.e., scenes having a high dynamic range), conventional image systems may capture images using inappropriate exposure times for a given scene, which may cause insufficient dynamic range capture in a combined HDR image.

It would therefore be desirable to provide improved imaging systems and exposure methods for high-dynamic-range imaging.

DETAILED DESCRIPTION

Imaging systems are widely used in electronic devices such as digital cameras, computers, cellular telephones, and other electronic devices. These electronic devices may include image sensors that gather incoming light to capture an image. The image sensors may include at least one image pixel array. The pixels in the image pixel array may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
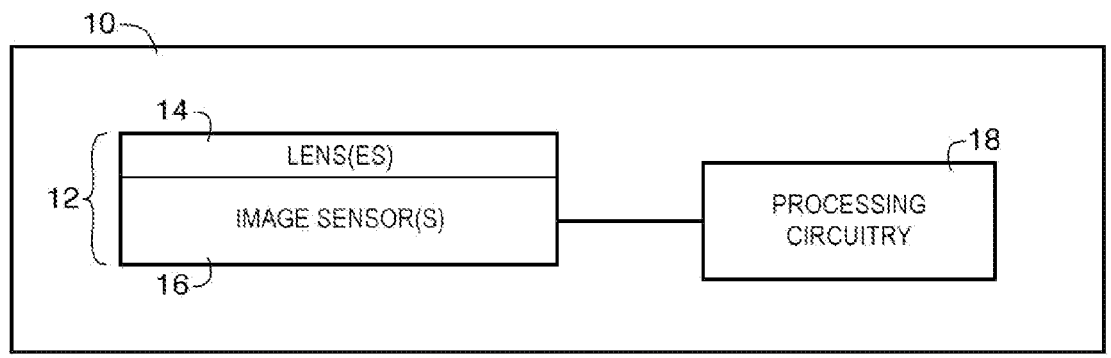
FIG. 1 shows an illustrative imaging device that can be used to capture auto-exposed high-dynamic-range images in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Device 10 may include a camera module such as camera module 12 coupled to control circuitry such as processing circuitry 18. Camera module 12 may be used to convert incoming light into digital image data. Camera module 12 may include one or more lenses 14 and one or more corresponding image sensors 16. During image capture operations, light from a scene may be focused onto each image sensor 16 using a respective lens 14. Lenses 14 and image sensors 16 may be mounted in a common package and may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from image sensor 16 and/or that form part of image sensor 16 (e.g., circuits that form part of an integrated circuit that controls or reads pixel signals from image pixels in an image pixel array on image sensor 16 or an integrated circuit within image sensor 16). Image data that has been captured by image sensor 16 may be processed and stored using processing circuitry 18. Processed image data may, if desired, be provided to external equipment (e.g., a computer or other device) using wired and/or wireless communications paths coupled to processing circuitry 18.

The dynamic range of an image may be defined as the luminance ratio of the brightest element in a given scene to the darkest element the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using a multiple integration (or multiple exposure (ME)) process. In a multiple exposure process, multiple images (sometimes referred to as image frames) of the same scene may be captured using different exposure times (sometimes referred to as integration times). A short-exposure image captured during a short integration time may better capture details of brightly lit portions of the scene, whereas a long-exposure image captured during a relatively longer integration time may better capture details of dark portions of the scene. The short-exposure and long-exposure images may be combined into a composite HDR image which is able to represent the brightly lit as well as the dark portions of the image.

In another suitable arrangement, HDR images may be captured by a digital camera using an interleaved integration (or interleaved exposure (IE)) process. In an interleaved integration process, images having rows of long-exposure image pixel values are interleaved with rows of short-exposure image pixel values. The long-exposure and short-exposure image pixel values in each interleaved image frame may be interpolated to form interpolated values. A long-exposure image and a short-exposure image may be generated using the long-exposure and the short-exposure values from the interleaved image frame and the interpolated. The long-exposure image and the short-exposure image may be combined to produce a composite HDR image which is able to represent the brightly lit as well as the dark portions of the image.

During image sensor operations, the dynamic range of a scene to be captured may vary (e.g., the dynamic range of a scene that is imaged may change as the image sensor is pointed in different directions, as the lighting conditions of the scene change, etc.). The duration of the long exposure (or long integration) and short exposure (or short integration) when capturing HDR images using image sensor 16 may be actively adjusted during imaging operations to allow for flexible HDR imaging of scenes having a variety of dynamic range conditions.

Figure 2:
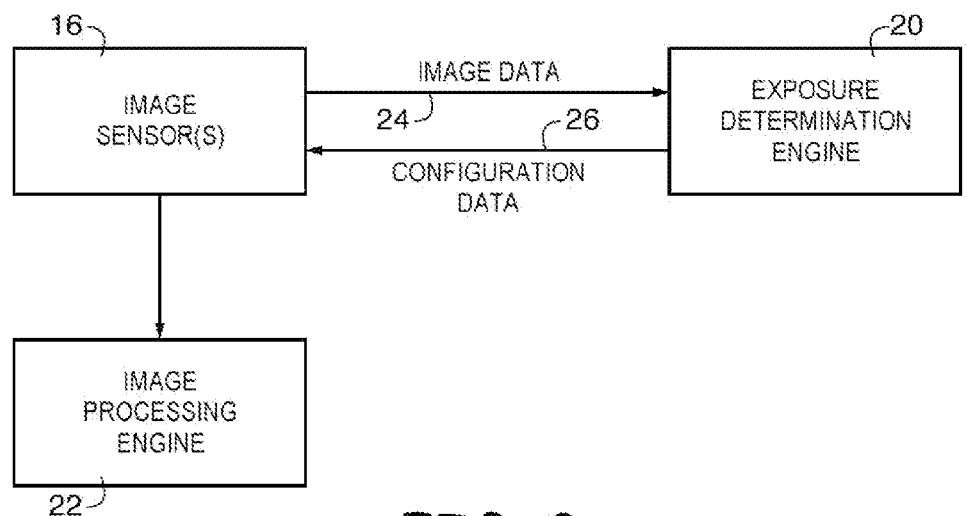
FIG. 2 is an illustrative diagram showing how an exposure determination engine may be used to provide configuration data to an image sensor for capturing auto-exposed high-dynamic-range images in accordance with an embodiment of the present invention.

FIG. 2 is a diagram showing how image sensor 16 may use processing circuitry such as exposure determination engine 20 to automatically determine long and short exposure durations during HDR imaging operations. Exposure determination engine 20 may be formed as a portion of processing circuitry 18 of FIG. 1, as circuitry on a common substrate with image sensor(s) 16, or may be implemented as software running on processing circuitry 18 or circuitry associated with image sensor(s) 16.

As shown in FIG. 2, image sensor 16 may provide image data to exposure determination engine 20 via path 24. Image data provided to exposure determination engine 20 may include images captured by image sensor 16 during HDR imaging operations (e.g., short exposure image frames, long exposure image frames, interleaved image frames including rows of long exposure image pixel values and rows of short exposure image pixel values, etc.). Exposure determination engine 20 may process received image data by collecting statistics from the received image data to automatically determine gain settings and durations of long and short exposures to be used by image sensor 16 for generating HDR images of a given scene. The duration of long and short exposures may sometimes be referred to as long exposure times and short exposure times, respectively.

Exposure determination engine 20 may provide configuration data to image sensor 16 over path 26. The configuration data provided to image sensor 16 may include configuration settings for the operation of image sensor 16. For example, the configuration data may include long and short exposure times and gain settings to be used by image sensor 16 when capturing subsequent image data.

Image sensor 16 may capture images using the settings in the configuration data received from exposure determination engine 20. For example, image sensor 16 may capture an image using the short integration times, long integration times, and gain settings generated by exposure determination engine 20. Images captured by image sensor 16 using configuration data received from exposure determination engine 20 may sometimes be referred to as auto-exposed image data (e.g., auto-exposed image frames), because the auto-exposed image data is captured using exposure times that are automatically generated by exposure determination engine 20 in response to an imaged scene.

Auto-exposed image data generated by image sensor 16 may be passed to image processing engine 22. Image processing engine 22 may process the auto-exposed image data to generate high-dynamic-range images. For example, image processing engine 22 may combine short integration pixel values and long integration pixel values captured by image sensor 16 using the configuration data generated by exposure determination engine 20 to generate high-dynamic-range images. High-dynamic-range images that are generated by image processing engine 22 may sometimes be referred to as auto-exposed high-dynamic-range images because the long and short exposure times used by image sensor 16 to generate auto-exposed image frames are determined automatically using exposure determination engine 20.

Figure 4:
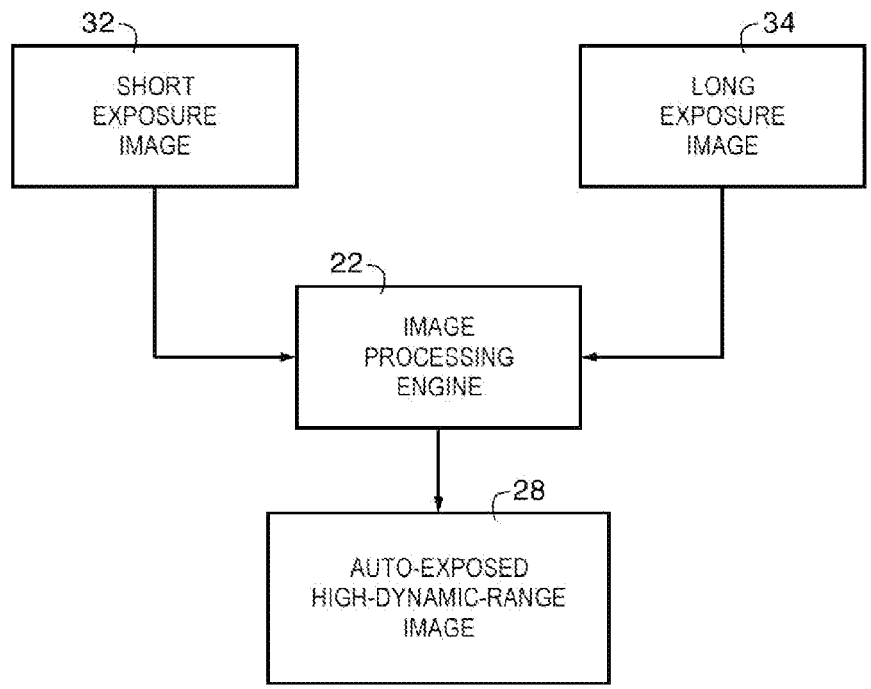
FIG. 4 is a diagram of illustrative first and second auto-exposed image frames that may be processed by an image processing engine to form an auto-exposed high-dynamic range image in accordance with an embodiment of the present invention.

As shown in FIG. 4, image processing engine 22 may be used to combine short exposure image 32 and long exposure image 34 captured using camera module 12 to form auto-exposed high-dynamic-range image 28 in which image pixel values from each of image 32 and image 34 have been optimally processed and combined to form the auto-exposed high-dynamic-range image. Short exposure image 32 may be a short exposure image captured using an auto-exposure short integration time T2 and long exposure image 34 may be captured using an auto-exposure long integration time T1 (e.g., times T1 and T2 may be exposure times generated by exposure determination engine 20). Image processing engine 22 may be formed as a portion of processing circuitry 18 of FIG. 1, as circuitry on a common substrate with image sensor(s) 16, or may be implemented as software running on processing circuitry 18 or circuitry associated with image sensor(s) 16.

In one suitable arrangement, image sensor 16 may use frame-sequential exposures in which an entire image frame is captured (i.e., all pixels in a pixel array accumulate image data) using auto-exposure long integration time T1 before a subsequent image frame is captured using auto-exposure short integration time T2. In another suitable arrangement, image sensor 16 uses row-sequential exposures in which a selection of pixel rows capture an image of a portion of a scene (i.e. a portion of an image frame) using auto-exposure long integration time T1 and the same selection of pixel rows is used to capture a second image of the same portion of the scene using auto-exposure short integration time T2 before subsequent rows are used to repeat a multiple exposure imaging process.

If desired, row-sequential exposures may be performed in which a selection of pixel rows are used to capture an image of a portion of a scene (i.e., a portion of an image frame) using auto-exposure long integration time T1, a subsequent selection of pixel rows are used to capture an image of a an additional portion of the scene using auto-exposure short integration time T2 and this process is repeated until pixel rows have been used to capture an image having image pixel values with interleaved exposure times. In this type of row-sequential image capture operation, a subsequent image may be captured using auto-exposure short integration time T2 for the first selection of pixel rows, auto-exposure long integration time T1 for the subsequent selection of pixel rows, and so on until all pixels rows have been used to capture a second image having image pixel values with interleaved exposure times.

Figure 5:
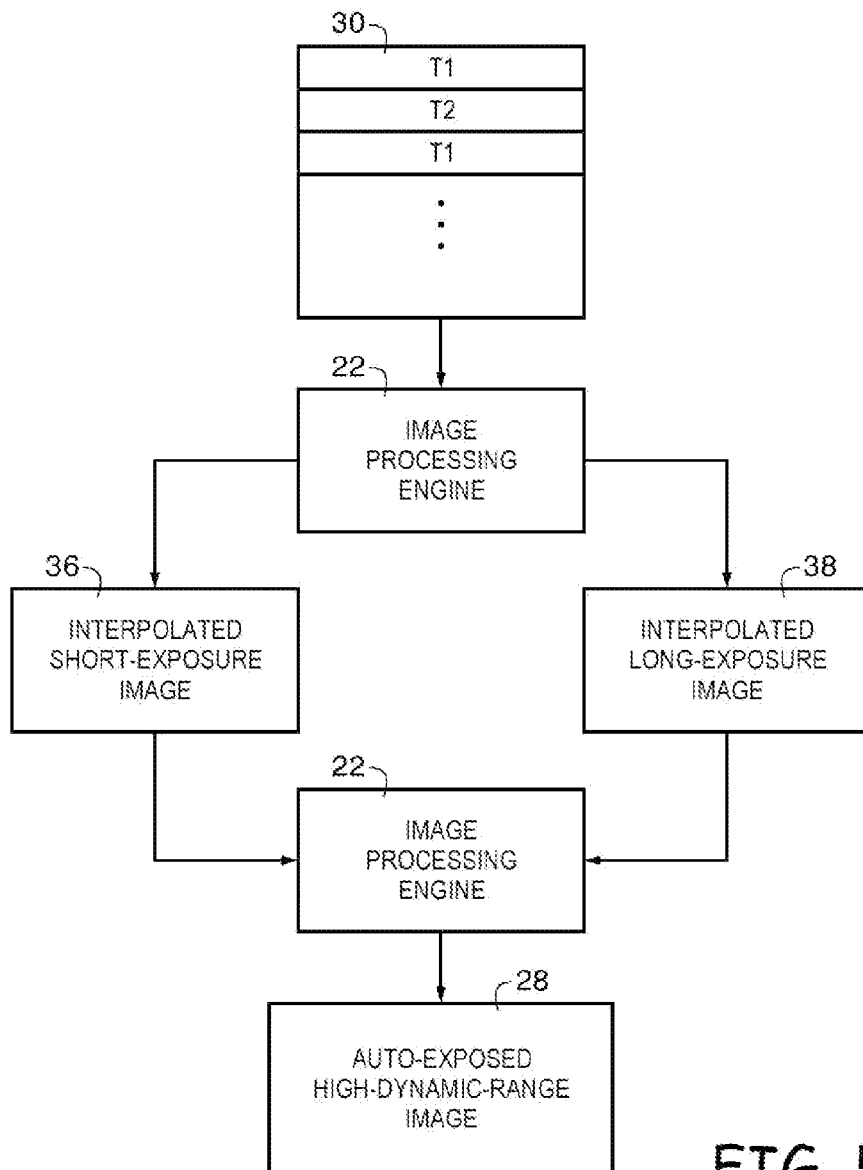
FIG. 5 is a diagram of illustrative first and second interpolated auto-exposed image frames that may be generated from an interleaved auto-exposed image frame and passed to an image processing engine to form an auto-exposed high-dynamic range image in accordance with an embodiment of the present invention.

Image processing engine 22 may be used to process an image having interleaved long and short exposure times (sometimes referred to as an interleaved image). Interleaved images such as interleaved image 30 of FIG. 5 may be capturing by alternating exposure times for each adjacent row of image pixels, every two rows of image pixels, every three rows of image pixels, or for larger groups of rows of image pixels. As shown in FIG. 5, image processing engine 22 may process interleaved image 30. Image pixel values for some rows of interleaved image 30 may have been captured using auto-exposure long integration time T1 and image pixel values for other rows of interleaved image 30 may have been captured using auto-exposure short integration time T2.

Image processing engine 22 may include sub-processing engines such as interpolation engines. Interpolation engines in image processing engine 22 may be used for generating an interpolated short-exposure image 36 and an interpolated long-exposure image 38 from interleaved image 30. Interpolated images 36 and 38 may be processed by image process engine 22 to produce auto-exposed high dynamic range image 28.

Auto-exposure long integration time T1 and auto-exposure short integration time T2 with which short exposure image 32, long exposure image 34, and interleaved image 30 are captured by image sensor 16 may be automatically determined using exposure determination engine 20 (FIG. 2). Auto-exposure integration times T1 and T2 may be automatically selected by exposure determination engine 20 in response to image data captured from image sensor 16 (e.g., in response to dynamic range conditions of a given scene that is imaged). Auto-exposure integration times T1 and T2 may be automatically determined by engine 20 to enable image sensor 16 to actively capture HDR images in response to a variety of scenes having different dynamic ranges.

Figure 3:
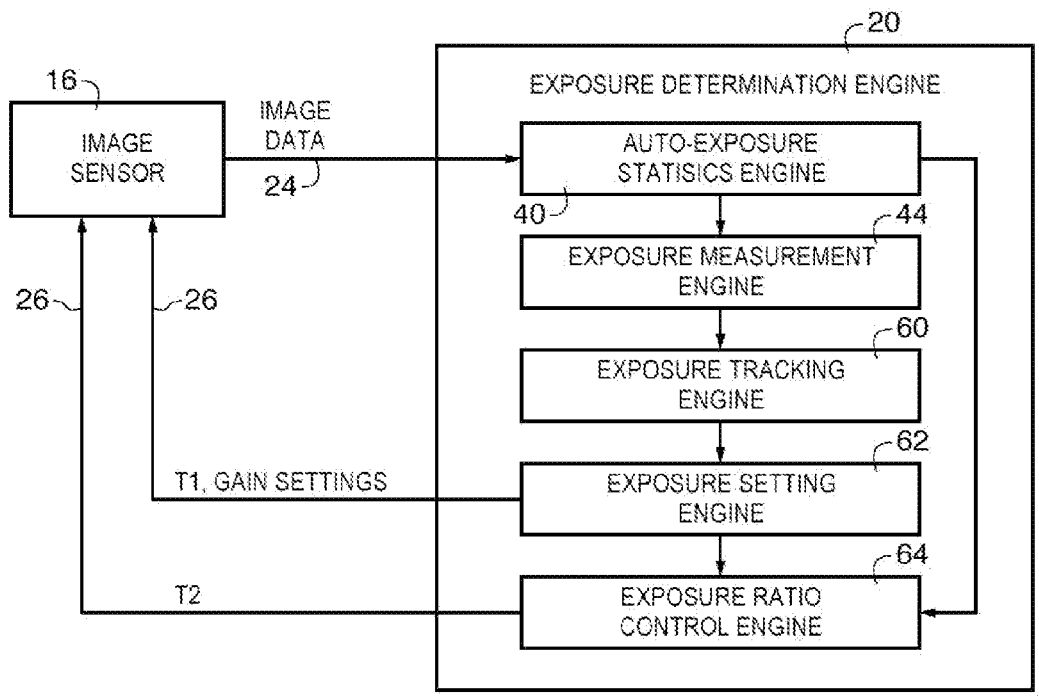
FIG. 3 is a diagram showing how an exposure determination engine of the type shown in FIG. 2 may include sub-engines for generating short and long exposure times for capturing auto-exposed high-dynamic-range images in accordance with an embodiment of the present invention.

Exposure determination engine 20 may determine auto-exposure integration times T1 and T2 for a particular scene to be imaged by processing image data received from image sensor 16. As shown in FIG. 3, exposure determination engine 20 may include multiple sub-engines for processing image data received from image sensor 16 to determine auto-exposure integration times T1 and T2.

In the example of FIG. 3, exposure determination engine 20 includes sub-engines such as auto-exposure statistics engine 40, exposure measurement engine 44, exposure tracking engine 60, exposure setting engine 62, and exposure ratio control engine 64. Auto-exposure statistics engine 40 may receive image data from image processor 16 and may generate auto-exposure statistics (sometimes referred to herein as image statistics) in response to the received image data. Statistics engine 40 may pass the auto-exposure statistics to exposure measurement engine 44 and exposure ratio control engine 64.

Exposure measurement engine 44 may determine exposure measurement data associated with the image data. Exposure measurement engine 44 may pass the exposure measurement data to exposure tracking engine 60. Exposure tracking engine 60 may smooth the exposure measurement data with respect to previously tracked exposure data and may generate an adjusted exposure level for the captured image data and save the current tracked exposure data. Exposure setting engine 62 may receive the adjusted exposure level from exposure tracking engine 60 and may generate auto-exposure long integration time T1 and image sensor gain settings based on the adjusted exposure level.

Exposure ratio control engine 64 may receive the adjusted exposure level from exposure setting engine 62. Exposure ratio control engine 64 may determine auto-exposure short integration time T2 based on auto-exposure long integration time T1 and the auto-exposure statistics received from statistics engine 40. Configuration data such as auto-exposure integration times T1 and T2 and the image sensor gain settings may be passed to image sensor 16 over path 26.

Figure 6:
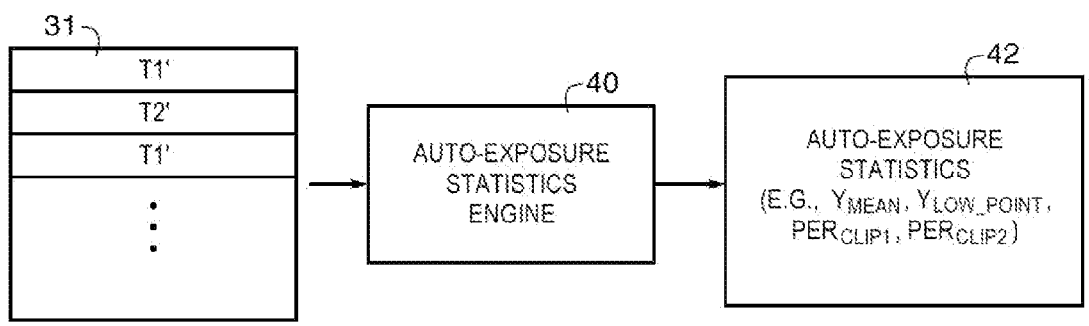
FIG. 6 is a diagram showing how an auto-exposure statistics engine may be used to generate auto-exposure statistics for automatically adjusting image exposure times in accordance with an embodiment of the present invention.

Exposure determination engine 20 may, for example, determine auto-exposure integration times T1 and T2 based on statistics associated with the image data received from image sensor 16. Exposure determination engine 20 may include sub-engines for identifying statistics associated with image data captured by image sensor 16, such as auto-exposure statistics engine 40. As shown in FIG. 6, interleaved image 31 captured by image sensor 16 may be provided to auto-exposure statistics engine 40 (e.g., via path 24 of FIG. 3). Interleaved image 31 may include rows that are captured by image sensor 16 using an initial long integration time T1' and an initial short integration time T2'. Auto-exposure statistics engine 40 may process interleaved image 31 to generate auto-exposure statistics 42 associated with image 31. During imaging operations, exposure determination engine 20 may generate auto-exposure integration times T1 and T2 based on initial integration times T1' and T2', and auto-exposure statistics 42.

Statistics engine 40 may extract a first histogram H1 associated with the portion of interleaved image 31 that was captured using long exposure time T1' and a second histogram H2 associated with the portion of interleaved image 31 that was captured using short exposure time T2'. Image 31 may include image data associated with multiple data channels. Histograms H1 and H2 may, for example, be collected from a luma channel, a green channel, or any other desired channel of image 31.

Statistics associated with image 31 that are extracted using engine 40 may include, for example, a luma average value $Y_{MEAN}$, a luma low point value $Y_{LOW\_POINT}$, and two clipping percentages $PER_{CLIP1}$ and $PER_{CLIP2}$ associated with histogram H2 that each correspond to a different clipping threshold. Statistics engine 40 may compute luma average value $Y_{MEAN}$ using a logarithmic average of T1' pixel values (e.g., as measured from histogram H1). For example, luma average value $Y_{MEAN}$ may be determined using the following equation:

$$Y_{MEAN} = POW\left(2, \sum_{i=1}^{NUM\_BINS} (\log_2(i) * H1(i))/M\right)$$  (1)

where M is the total number of image pixels in image sensor 16 that were exposed for long exposure time T1', where i is a given bin number of histogram H1, where H1(i) is the value of histogram H1 at bin i, where $\log_2(i)$ is a base-two logarithm of i, where NUM_BIN is the total number of bins in histogram H1, and where POW(2, X) is a power function equivalent to two to the power of X. In the example of equation 1, $X = \sum_{i=1}^{NUM\_BINS} (\log_2(i) * H1(i))/M$.

In another suitable arrangement, a weighted zone average may be used to determine luma average $Y_{MEAN}$. In this example, an image 31 having dimensions M×N may include a number of zones of image pixels. A mean value ZONEAVG (j) of each zone j may have a corresponding weight W(j). In this example, luma average value $Y_{MEAN}$ may be determined using the following equation:

$$Y_{MEAN} = POW\left(2, \frac{\sum_{j}(\log_2(ZONEAVG(j)) * W(j))}{\sum_{j} W(j)}\right)$$  (2)

where the summations are performed for each zone j over an M×N image.

Statistics engine 40 may determine luma low point value $Y_{LOW\_POINT}$ as a value at which the integrated area of histogram H1 reaches a selected percentage R of the total area of histogram H1. Low point value $Y_{LOW\_POINT}$ may be determined by enforcing two conditions on histogram H1 as given by the following equations:

$$\sum_{i=1}^{Y\_LOW\_POINT} H1(i) \leq R * M, \text{ and}$$ (3)

$$\sum_{i=1}^{Y\_LOW\_POINT} H1(i) > R * M,$$  (4)

where M is the total number of image pixels in image sensor 16 that were exposed for long exposure time T1'.

Clipping percentage $PER_{CLIP1}$ associated with histogram H2 may be determined as the percentage of pixel values in histogram H2 that exceeds a pre-determined threshold value $THR_{CLIP1}$. Pixels having a pixel value that exceeds threshold value $THR_{CLIP1}$ may sometimes be referred to as clipping pixels. Clipping pixels may be associated with over-saturated or excessively high captured image signals. Clipping percentage $PER_{CLIP2}$ associated with histogram H2 may be determined as the percentage of pixel values in histogram H2 that exceeds one-half of threshold value $THR_{CLIP1}$ (e.g., that exceeds value $THR_{CLIP1}/2$). If desired, a second clipping threshold value $THR_{CLIP2}$ may be identified for pixel values in histogram H2 (e.g., second threshold value $THR_{CLIP2}$ may be different from threshold value $THR_{CLIP1}/2$). In the scenario where second clipping threshold value $THR_{CLIP2}$ is defined for pixel values in histogram H2, clipping percentage $PER_{CLIP2}$ may be determined as the percentage of pixel values in histogram H2 that exceeds threshold $THR_{CLIP2}$. Auto-exposure statistics 42 (e.g., $Y_{MEAN}$, $Y_{LOW\_POINT}$, $PER_{CLIP1}$, and $PER_{CLIP2}$) may be used by exposure determination engine 20 to determine auto-exposure integration times T1 and T2.

The example of FIG. 6 is merely illustrative. In general, auto-exposure statistics 42 may include any desired statistics associated images captured by image sensor 16. If desired, statistics engine 40 may generate statistics 42 in response to any desired images captured using initial integration times T1' and T2' (e.g., images with frame-sequential exposures, row sequential exposures, interleaved exposures, etc.).

In general, the exposure level (or brightness level) of an image is related to the integration times used to capture the image. Exposure determination engine 20 may monitor the brightness of image 31 to determine how to adjust integration times during imaging operations (e.g., to determine how to set auto-exposure integration times T1 and T2). Exposure determination engine 20 may include sub-engines for measuring exposure levels of image 31 such as exposure measurement engine 44 (see, e.g., FIG. 3).

Figure 7:
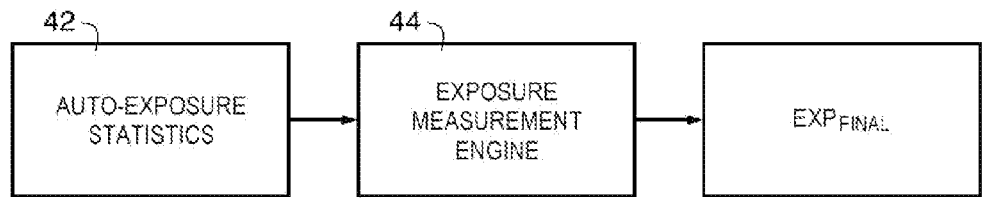
FIG. 7 is a diagram showing how an exposure measurement engine may be used to generate a final exposure value based on statistics generated by auto-exposure statistics engine of the type shown in FIG. 6 in accordance with an embodiment of the present invention.

As shown in FIG. 7, exposure measurement engine 44 may receive auto-exposure statistics 42 from auto-exposure statistics engine 40 (FIG. 6). Exposure measurement engine 44 may determine a final exposure level $EXP_{FINAL}$ of image 31 based on statistics 42. Final exposure level $EXP_{FINAL}$ may characterize the exposure level of image 31.

Figure 8:
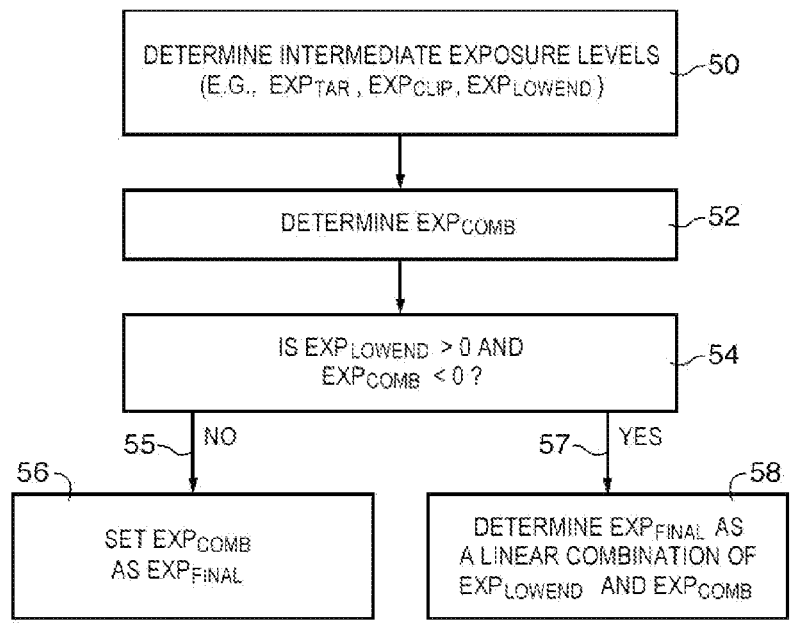
FIG. 8 is a flow chart showing how a final exposure value may be generated by an exposure measurement engine of the type shown in FIG. 7 in accordance with an embodiment of the present invention.

Illustrative steps that may be performed by exposure measurement engine 44 to generate final exposure level $EXP_{FINAL}$ using auto-exposure statistics 42 are shown in FIG. 8.

At step 50, exposure measurement engine 44 may determine intermediate exposure levels associated with image 31. For example, engine 44 may determine a target exposure level $EXP_{TAR}$, a clipping exposure level $EXP_{CLIP}$, and a low end-point exposure level $EXP_{LOWEND}$.

Exposure measurement engine 44 may determine target exposure level $EXP_{TAR}$ based on a target brightness value $Y_{TAR}$. Target brightness value $Y_{TAR}$ may be a pre-determined brightness value that is dependent upon the brightness of the scene captured. In general, target brightness value $Y_{TAR}$ may increase as the brightness of a given scene increases. Target exposure level $EXP_{TAR}$ may, for example, be determined using the following equation:

$$EXP_{TAR} = \log_2(Y_{TAR}/Y_{MEAN})$$  (5)

where $Y_{MEAN}$ is the luma average value (e.g., as determined by auto-exposure statistics engine 40 of FIG. 6).

Exposure measurement engine 44 may determine clipping exposure level $EXP_{CLIP}$ based on a clipping percentage $PER_{CLIP1}$. For example, clipping exposure level $EXP_{CLIP}$ may be determined using the following equation:

$$EXP_{CLIP} = -K * PER_{CLIP1},$$  (6)

where $PER_{CLIP1}$ is clipping percentage determined by statistics engine 40, and where K is a proportionality constant for converting a pixel clipping percentage to a corresponding exposure level (e.g., for converting $PER_{CLIP1}$ to a corresponding exposure level). Proportionality constant K may, if desired, be determined from calibration of image sensor 16.

Exposure measurement engine 44 may determine low end exposure level $EXP_{LOWEND}$ based on luma low point value $Y_{LOW\_POINT}$. For example, low end exposure level $EXP_{LOWEND}$ may be determined using the following equation:

$$EXP_{LOWEND} = \log_2(Y_{LOW\_TARGET}/Y_{LOW\_POINT}),$$  (7)

where $Y_{LOW\_TARGET}$ is a target value for a selected percentage R of the total area of histogram H1 (e.g., $Y_{LOW\_TARGET}$ is a target value for low end pixels in histogram H1). Low end exposure level $EXP_{LOWEND}$ may be used to exclude insufficient pixel values from inclusion in final exposure level $EXP_{FINAL}$ (e.g., pixel values that are too low to be displayed properly using a display).

At step 52, exposure measurement engine 44 may determine a combined exposure level $EXP_{COMB}$ based on target exposure level $EXP_{TAR}$ and clipping exposure level $EXP_{CLIP}$. For example, combined exposure level $EXP_{COMB}$ may be determined as a linear combination (e.g., a weighted sum) of target exposure level $EXP_{TAR}$ and clipping exposure level $EXP_{CLIP}$. Combined exposure level $EXP_{COMB}$ may, for example, be determined using the following equation:

$$EXP_{COMB} = (1 - W_{CLIP})*EXP_{TAR} + W_{CLIP}*EXP_{CLIP}, \qquad (8)$$

where $W_{CLIP}$ is a weighting factor for clipping exposure level $EXP_{CLIP}$. Weighting factor $W_{CLIP}$ may, for example, have a constant value between zero and one.

At step 54, exposure measurement engine 44 may determine whether $EXP_{LOWEND}$ is positive and $EXP_{COMB}$ is negative. If $EXP_{LOWEND}$ is greater than zero and that $EXP_{COMB}$ is less than zero, processing may proceed to step 58 via path 57.

At step 58, exposure engine 44 may compute final exposure level $EXP_{FINAL}$ as a linear combination (e.g., a weighted sum) of low end exposure level $EXP_{LOWEND}$ and combined exposure level $EXP_{COMB}$. For example, final exposure level $EXP_{FINAL}$ may be determined by the following equation:

$$EXP_{FINAL} = (1 - W_{LOWEND})*EXP_{COMB} + W_{LOWEND}*EXP_{LOWEND}, \qquad (9)$$

where $W_{LOWEND}$ is any desired weighting factor for low end exposure level $EXP_{LOWEND}$.

If $EXP_{LOWEND}$ is less than zero or $EXP_{COMB}$ is greater than zero, processing may proceed to step 56 via path 55. At step 55, exposure engine 44 may set combined exposure level $EXP_{COMB}$ as final exposure level $EXP_{FINAL}$.

Figure 9:
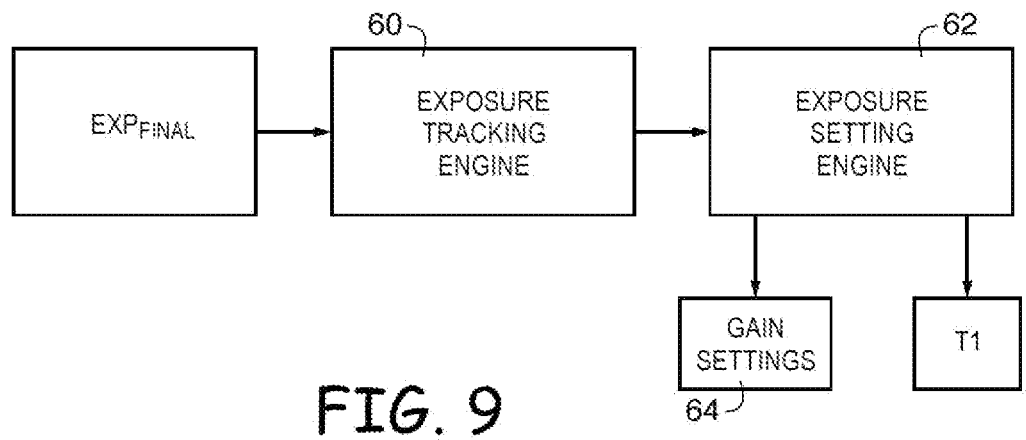
FIG. 9 is a diagram showing how an exposure tracking engine and an exposure setting engine may be used to generate auto-exposure gain settings and an auto-exposed long integration time for generating auto-exposed high-dynamic-range images in accordance with an embodiment of the present invention.

Exposure determination engine 20 may include exposure processing sub-engines such as exposure tracking engine 60 and exposure setting engine 62 (FIG. 3). Exposure tracking engine 60 and exposure setting engine 62 may adjust exposure level $EXP_{FINAL}$ to control the overall brightness of subsequent images captured using image sensor 16 (e.g., to reduce the number of clipped pixels in the captured image, to ensure sufficient shadow detail, etc.). As shown in FIG. 9, exposure tracking engine 60 may receive final exposure level $EXP_{FINAL}$ from exposure measurement engine 44. In addition, tracking engine 60 may output and save new tracked exposure data.

Exposure tracking engine 60 may smooth the exposure levels of images captured by image sensor 16 (e.g., exposure tracking engine 60 may adjust a current exposure level to reduce or "smooth" variations between the current exposure level and previous exposure levels). Tracking engine 60 may apply recursive filtering to final exposure level $EXP_{FINAL}$ to determine tracked exposure value $EXP_{TRACK}$. A tracked exposure value corresponding to a current image frame such as image 31 may sometimes be labeled $EXP_{TRACK}^{CUR}$. A tracked exposure value corresponding to a previous image frame (e.g., an image frame that was captured by image sensor 16 prior to image 31) may sometimes be labeled $EXP_{TRACK}^{PRE}$. Current tracked exposure level $EXP_{TRACK}^{CUR}$ may be determined as a linear combination (e.g., a weighted sum) of previous tracked exposure level $EXP_{TRACK}^{PRE}$ and final exposure level $EXP_{FINAL}$. For example, current tracked exposure level $EXP_{TRACK}^{CUR}$ may be determined using the following equation:

$$EXP_{TRACK}^{CUR} = (1-T)*EXP_{TRACK}^{PRE} + T*EXP_{FINAL}, \qquad (10)$$

where T is a tracking coefficient (or weight) that may be selected to control the tracking speed of engine 60. For example, a tracking coefficient of 1.0 may represent a maximum tracking speed of tracking engine 60.

Exposure determination engine 20 may implement an auto-exposure flag $AE_{FLAG}$ to indicate whether to apply $EXP_{FINAL}$ to a new exposure. Exposure tracking engine 60 may analyze current tracked exposure level $EXP_{TRACK}^{CUR}$ to determine a value at which to set auto-exposure flag $AE_{FLAG}$. For example, exposure tracking engine 60 may set auto-exposure flag $AE_{FLAG}$ to a value of one if an adjustment is needed for exposure (e.g., by applying $EXP_{FINAL}$ to a new exposure) and may set flag $AE_{FLAG}$ to a value of zero if no adjustment is needed.

Engine 60 may compare current tracked exposure level $EXP_{TRACK}^{CUR}$ to a predetermined threshold $THR_A$ to determine whether to adjust final exposure level $EXP_{FINAL}$. For example, if the magnitude of current tracked exposure level $EXP_{TRACK}^{CUR}$ is greater than threshold $THR_A$, an adjustment to final exposure level $EXP_{FINAL}$ is needed and auto-exposure flag $AE_{FLAG}$ may be set to a value of one. If the magnitude of current tracked exposure level $EXP_{TRACK}^{CUR}$ is less than or equal to threshold $THR_A$, an adjustment to final exposure level $EXP_{FINAL}$ is not needed and auto-exposure flag $AE_{FLAG}$ may be set to a value of zero.

In the scenario where an adjustment to image exposure is needed (e.g., when $AE_{FLAG}$ is set to one), a damping factor KA may be applied to control the amount of exposure used for adjusting final exposure level $EXP_{FINAL}$. Tracking engine 60 may determine an intermediate exposure adjustment level $EXP_{ADJUST}$ based on final exposure level $EXP_{FINAL}$ and the damping factor. For example, intermediate exposure adjustment level $EXP_{ADJUST}$ may be determined as a multiplicative product of damping factor KA and final exposure level $EXP_{FINAL}$. If desired, a maximum adjustment exposure level MAXADJ and a minimum adjustment exposure level MINADJ may be imposed on adjustment level $EXP_{ADJUST}$ (e.g., MINADJ and MAXADJ may be selected to limit the range of acceptable adjustment levels $EXP_{ADJUST}$). After imposing the minimum and maximum exposure limits on adjustment level $EXP_{ADJUST}$, engine 60 may determine a final exposure adjustment level $EXP_{ADJUST\_FINAL}$ that may be used to adjust the desired exposure level and integration times of images captured using image sensor 16. For example, final exposure adjustment level $EXP_{ADJUST\_FINAL}$ may be determined using the following equation:

$$EXP_{ADJUST\_FINAL} = \begin{cases} SIGN(EXP_{ADJUST})*MINADJ, & \text{if } |EXP_{ADJUST}| \leq MINADJ \\ EXP_{ADJUST}, & \text{if } MINADJ < |EXP_{ADJUST}| < MAXADJ \\ \text{sign}(EXP_{ADJUST})*MAXADJ, & \text{if } |EXP_{ADJUST}| \geq MAXADJ, \end{cases} \qquad (11)$$

where SIGN($EXP_{ADJ}$) is the sign of exposure adjustment level $EXP_{ADJUST}$, and where $|EXP_{ADJUST}|$ is the absolute value of adjustment level $EXP_{ADJUST}$.

Final exposure adjustment level $EXP_{ADJUST\_FINAL}$ may be passed to exposure setting engine 62. Exposure setting engine 62 may apply final exposure adjustment level $EXP_{ADJUST\_FINAL}$ to the current exposure. A new exposure (i.e., after applying final adjustment level $EXP_{ADJUST\_FINAL}$) may be appropriately distributed among integration time (exposure time), analog gain, and digital gain. In other words, exposure setting engine 62 may determine auto-exposure integration times and gain settings to be used by image sensor 16 to capture HDR images from a particular scene. In general, exposure determination engine 20 may increase exposure level by increasing integration time up to a maximum allowed integration time and may subsequently increasing analog and digital gain settings for image sensor 16. Exposure determination engine 20 may decrease exposure level by decreasing digital gain and analog gain until the digital and analog gain reach a minimum gain value, after which integration time may then be decreased.

Exposure setting engine 62 may distribute final exposure adjustment level $EXP_{ADJUST\_FINAL}$ to initial long integration time T1' to generate auto-exposure long integration time T1. Exposure setting engine 62 may provide analog and digital gain settings 64 corresponding to auto-exposure long integration time T1. Auto-exposure long integration time T1 and gain settings 64 may be used by image sensor 16 to generate auto-exposed high-dynamic-range images. Auto-exposed high-dynamic-range images captured by image sensor 16 may be more flexible than conventional high-dynamic-range images captured without automatically adjusting exposure times (e.g., auto-exposed HDR images captured by image sensor 16 may allow for improved HDR imaging for a wide variety of scenes and dynamic range conditions when compared to conventional HDR imaging).

Figure 10:
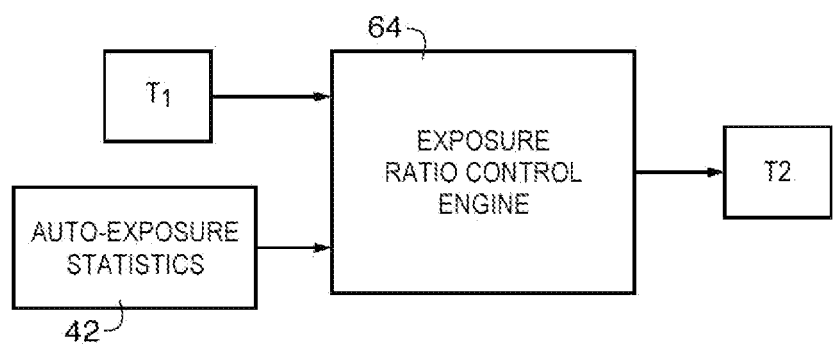
FIG. 10 is a diagram showing how an exposure ratio control engine may use an auto-exposed long integration time and auto-exposure statistics to generate an auto-exposed short integration time for generating auto-exposed high-dynamic-range images in accordance with an embodiment of the present invention.

Exposure determination engine 20 may include exposure processing sub-engines such as exposure ratio control engine 64 (FIG. 3). As shown in FIG. 10, exposure ratio control engine 64 may receive auto-exposure long integration time T1 from exposure setting engine 62 and may receive auto exposure statistics 42 from statistics engine 40 (FIG. 6). Exposure ratio control engine 64 may determine auto-exposure short integration time T2 based on auto-exposure long integration time T1 and auto exposure statistics 42.

Auto-exposure long integration time T1 and auto-exposure short integration time T2 may be related by an exposure ratio $EXP_{RATIO}$. For example, time T1 may be equal to the multiplicative product of exposure ratio $EXP_{RATIO}$ and time T2. Initial integration times T1' and T2' may be related by an initial exposure ratio $EXP_{RATIO}$' (e.g., $EXP_{RATIO}$' is a ratio of integration times prior to auto-exposure adjustment by exposure determination engine 20). Exposure ratio control engine 64 may determine exposure ratio $EXP_{RATIO}$ based on auto exposure statistics 42 and initial exposure ratio $EXP_{RATIO}$'. In general, a larger exposure ratio may allow image sensor 16 to capture a higher dynamic range scene than a lower exposure ratio. Exposure ratio $EXP_{RATIO}$ may, for example, be any suitable power of two (e.g., 1, 2, 4, 8, etc.). After determining exposure ratio $EXP_{RATIO}$, engine 64 may apply exposure ratio $EXP_{RATIO}$ to auto-exposure long integration time T1 to generate auto-exposure short integration time T2. Auto-exposure integration times T1 and T2 may be used by image sensor 16 to capture auto-exposed high-dynamic range images (e.g., auto-exposed HDR images such as auto-exposed HDR image 28 of FIGS. 3 and 4).

Figure 11:
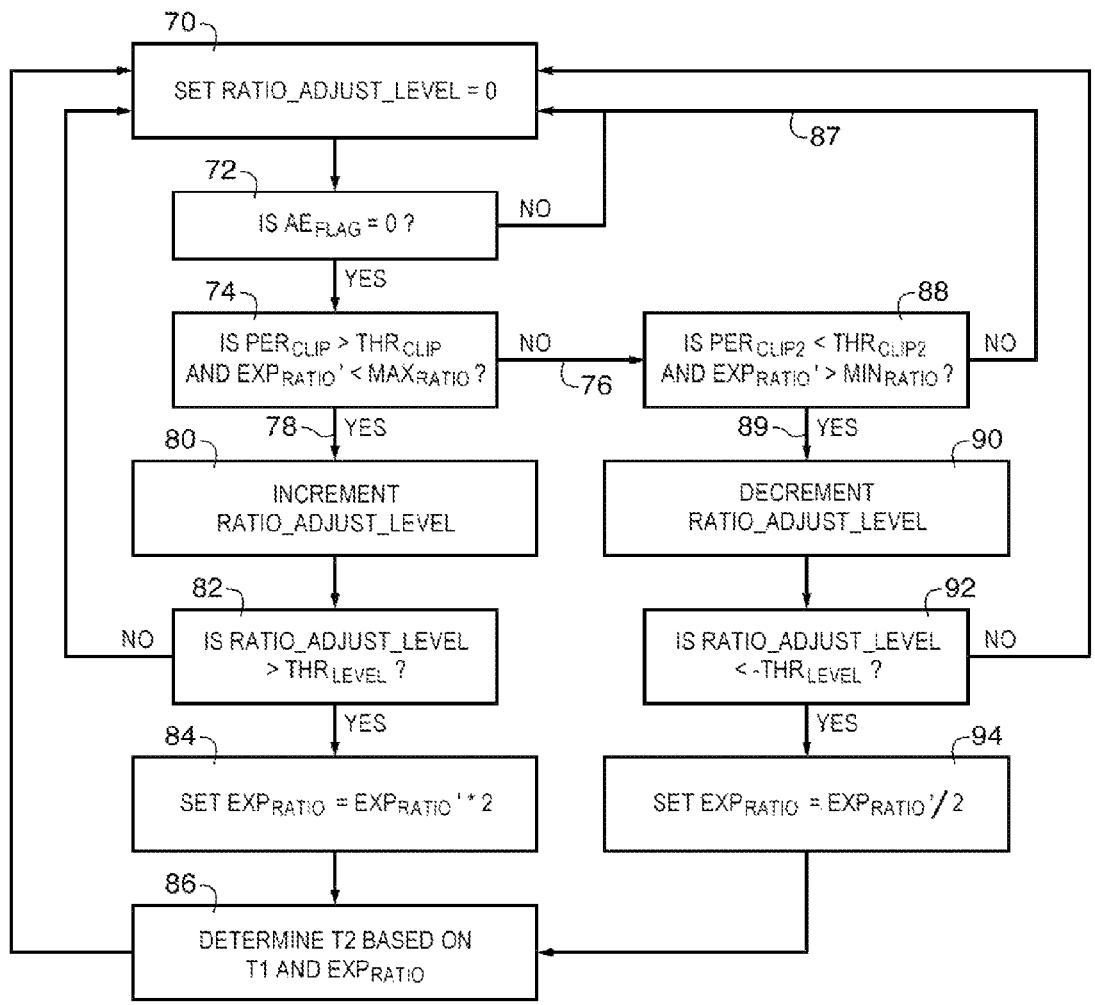
FIG. 11 is a flow chart showing how an auto-exposed short integration time may be generated by an exposure ratio control engine of the type shown in FIG. 10 for generating auto-exposed high-dynamic-range images in accordance with an embodiment of the present invention.

Illustrative steps that may be performed by exposure ratio control engine 64 to generate auto-exposure short integration time T2 using auto-exposure statistics 42, initial exposure ratio $EXP_{RATIO}$', and auto-exposure long integration time T1 are shown in FIG. 11.

A significant level used to indicate the need to change exposure ratio $EXP_{RATIO}$ may sometimes be labeled herein as RATIO_ADJUST_LEVEL. Once RATIO_ADJUST_LEVEL reaches a certain threshold, engine 64 may adjust exposure ratio $EXP_{RATIO}$. RATIO_ADJUST_LEVEL may be updated for each image frame that is processed by exposure determination engine 20. For example, RATIO_ADJUST_LEVEL may be updated to monitor whether the total number of clipping pixels continuously exceeds a clipping threshold. At step 70, engine 64 may initialize RATIO_ADJUST_LEVEL by setting RATIO_ADJUST_LEVEL to zero.

At step 72, engine 64 may determine whether auto-exposure flag $AE_{FLAG}$ is equal to zero. If auto-exposure flag $AE_{FLAG}$ has a non-zero value (indicating that exposure determination engine 20 is still adjusting long exposure T1), processing may loop back to step 70 to reset RATIO_ADJUST_LEVEL to zero. If auto-exposure flag $AE_{FLAG}$ is equal to zero (indicating that exposure determination engine 20 has finished adjusting long exposure T1), processing may proceed to step 74.

At step 74, engine 64 may compare clipping percentage $PER_{CLIP1}$ associated with histogram H2 (i.e., the histogram associated with initial long integration time T2') to clipping threshold $THR_{CLIP1}$ and may compare initial exposure ratio $EXP_{RATIO}$' to a maximum exposure ratio threshold $MAX_{RATIO}$. Exposure ratio threshold $MAX_{RATIO}$ may be any desired threshold that limits the exposure ratio. If clipping percentage $PER_{CLIP1}$ is greater than clipping threshold $THR_{CLIP}$ and initial exposure ratio $EXP_{RATIO}$' is less than exposure ratio threshold $MAX_{RATIO}$, processing may proceed to step 80 via path 78.

At step 80, engine 64 may increment RATIO_ADJUST_LEVEL. Engine 64 may subsequently compare the incremented RATIO_ADJUST_LEVEL to a predetermined ratio adjustment threshold $THR_{LEVEL}$ (step 82). Adjustment threshold $THR_{LEVEL}$ may be a predetermined threshold that identifies whether there is an excessive percentage of clipping pixel values for a given period of time (e.g., if RATIO_ADJUST_LEVEL is greater than $THR_{LEVEL}$, there may be an excessive number of clipping pixel values). If the incremented RATIO_ADJUST_LEVEL is greater than $THR_{LEVEL}$, processing may proceed to step 84. If the incremented RATIO_ADJUST_LEVEL is less than or equal to threshold $THR_{LEVEL}$, processing may loop back to step 70 to repeat processing for the incremented RATIO_ADJUST_LEVEL.

At step 84, engine 64 may set exposure ratio $EXP_{RATIO}$ equal to two times initial exposure ratio $EXP_{RATIO}$'. By doubling initial exposure ratio $EXP_{RATIO}$' to generate exposure ratio $EXP_{RATIO}$, engine 64 may reduce the percentage of clipping pixels in the final image. Processing may subsequently proceed to step 86 to determine auto-exposure short integration time T2 based on exposure ratio $EXP_{RATIO}$ and auto-exposure long integration time (e.g., as generated by exposure setting engine 62 of FIG. 9). For example, engine 64 may compute auto-exposure short integration time T2 by dividing auto-exposure long integration time T1 by exposure ratio $EXP_{RATIO}$.

If clipping percentage $PER_{CLIP}$ is not greater than clipping threshold $THR_{CLIP}$ or initial exposure ratio $EXP_{RATIO}$' is greater than exposure ratio threshold $MAX_{RATIO}$, processing may proceed to step 88 via path 76.

At step 88, engine 64 may compare clipping percentage $PER_{CLIP2}$ associated with histogram H2 (i.e., the histogram associated with initial short integration time T2') to second clipping threshold $THR_{CLIP2}$ and may compare initial exposure ratio $EXP_{RATIO}'$ to minimum exposure ratio $MIN_{RATIO}$. Minimum exposure ratio $MIN_{RATIO}$ may be any desired minimum exposure ratio that limits initial exposure ratio $EXP_{RATIO}'$ (e.g., that sets a minimum acceptable exposure ratio $EXP_{RATIO}'$). If clipping percentage $PER_{CLIP2}$ is greater than second clipping threshold $THR_{CLIP2}$ or initial exposure ratio $EXP_{RATIO}'$ is less than minimum exposure ratio $MIN_{RATIO}$, processing may loop back to step 70 via path 87. If clipping percentage $PER_{CLIP2}$ is less than second clipping threshold $THR_{CLIP2}$ and initial exposure ratio $EXP_{RATIO}'$ is greater than minimum exposure ratio $MIN_{RATIO}$, processing may proceed to step 90 via path 89.

At step 90, engine 64 may decrement RATIO_ADJUST_LEVEL. Engine 64 may subsequently compare the decremented RATIO_ADJUST_LEVEL to the negative of predetermined ratio adjustment threshold $THR_{LEVEL}$ (step 82). If the decremented RATIO_ADJUST_LEVEL is less than $-THR_{LEVEL}$, short integration time T2 may be too low (e.g., the associated pixel values may be insufficient). If the decremented RATIO_ADJUST_LEVEL is less than $-THR_{LEVEL}$, processing may proceed to step 94. If the decremented RATIO_ADJUST_LEVEL is greater than or equal to $-THR_{LEVEL}$, processing may loop back to step 70.

At step 94, engine 64 may set exposure ratio $EXP_{RATIO}$ equal to half of initial exposure ratio $EXP_{RATIO}'$. By halving initial exposure ratio $EXP_{RATIO}'$ to generate exposure ratio $EXP_{RATIO}$, engine 64 may improve signal-to-noise ratio of the final image. Processing may subsequently proceed to step 86 to determine auto-exposure short integration time T2 based on exposure ratio $EXP_{RATIO}$ (as determined at step 94) and auto-exposure long integration time T1.

Auto-exposure integration times T1 and T2 may be used to capture auto-exposed high-dynamic-range images using image sensor 16 (FIG. 2). For example, image sensor 16 may capture a short exposure image using auto-exposure integration time T2 and a long exposure image using auto-exposure integration time T1. Image processing engine 22 (as shown in FIG. 4) may combine the short and long exposure images captured using auto-exposure integration times T1 and T2 to produce auto-exposed high-dynamic range image 28.

In another suitable arrangement, image sensor 16 may capture an interleaved image using auto-exposure integration times T1 and T2. Image processing engine 22 may subsequently produce auto-exposed high-dynamic-range image 28 (see FIG. 5).

The examples of FIGS. 2-11 are merely illustrative. If desired, any number of auto-exposure integration times may be used for high-dynamic-range imaging using image sensor 16. For example, three, four, or five or more auto-exposure integration times may be used. In the scenario where three auto-exposure integration times are used, image sensor 16 may capture images using three integration times and exposure determination engine 20 may determine three auto-exposure integration times based on the images captured by sensor 16.

Figure 12:
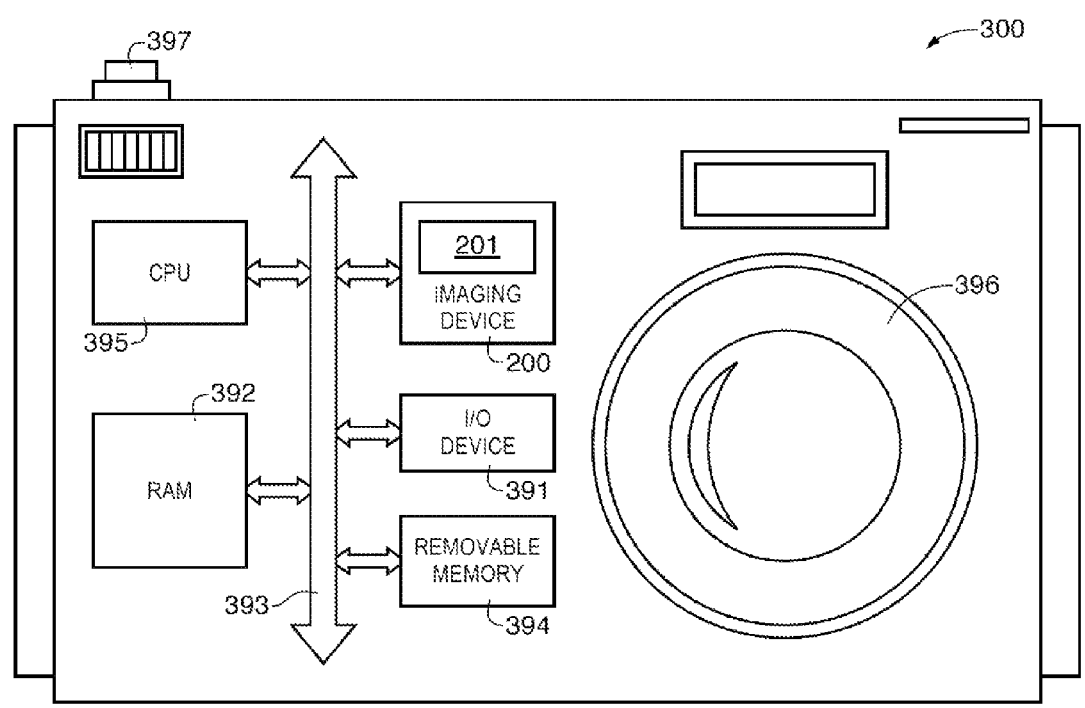
FIG. 12 is a block diagram of a processor system employing the image sensor of FIGS. 1-11 in accordance with an embodiment of the present invention.

FIG. 12 shows in simplified form a typical processor system 300, such as a digital camera, which includes an imaging device such as imaging device 200 (e.g., an imaging device 200 such as camera module 12 of FIG. 1 employing an image processing engine such as exposure determination engine 20 of FIGS. 2-11, and which is configured to generate auto-exposed high-dynamic-range images as described in FIGS. 1-11). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating systems and methods for generating auto-exposed HDR images of a scene using a camera module having an image sensor and processing circuitry.

The image sensor may capture a first image and the processing circuitry may generate a first exposure time and a second exposure time based on the first captured image. The image sensor may subsequently capture a second image having long-exposure image pixel values that are captured using the first exposure time and short-exposure image pixel values that are captured using the second exposure time. The captured first image may include initial long-exposure image pixel values that are captured using an initial long-exposure time that may be different from the first exposure time and initial short-exposure image pixel values that are captured using an initial short-exposure time that may be different from the second exposure time.

The processing circuitry may generate the first and second exposure times by generating statistics associated with the captured first image (e.g., image statistics associated with the initial long-exposure image pixel values and initial short-exposure image pixel values). The statistics generated by the processing circuitry may include a luma mean value and a luma low point value of the first captured image. If desired, the generated statistics may include a first and second clipping percentages associated with the initial short-exposure image pixel values.

The processing circuitry may determine an exposure level of the captured first image based on the generated image statistics. For example, the processing circuitry may compute the exposure level as a linear combination of a target exposure level and a clipping exposure level associated with the captured first image. The processing circuitry may generate a newly adjusted exposure including the first exposure time for long exposed pixels based on the determined exposure level and image statistics, and may generate the second exposure time for short exposed pixels based on the first exposure time and image statistics. If desired, the processing circuitry may generate image sensor gain settings based on the exposure adjustment level to be used by the image sensor to capture the second image.

The processing circuitry may determine an exposure ratio based on the generated statistics that relates the first and second exposure times. The processing circuitry may subsequently generate the second exposure time based on the exposure ratio and the first exposure time. The processing circuitry may generate a long-exposure image and a short-exposure image from the captured second image. For example, the processing circuitry may interpolate the long-exposure and short-exposure image pixel values to generate the long-exposure and short-exposure images. The processing circuitry may combine the short-exposure image and the long-exposure image to generate an auto-exposed high-dynamic-range image.

In another suitable arrangement, the image sensor may capture an image having long-exposure image pixel values captured using the first exposure time and an additional image having short-exposure image pixel values captured using the second exposure time. The processing circuitry may subsequently generate an auto-exposed high-dynamic-range image using the image having long-exposure image pixel values and the image having short-exposure image pixel values.

The image sensor and processing circuitry for generating auto-exposed high-dynamic-range images may be implemented in a system that also includes a central processing unit, memory, input-output circuitry, and an imaging device that further includes a pixel array, a lens for focusing light onto the pixel array, and a data converting circuit.

The foregoing is merely illustrative of the principles of this invention which can be practiced in other embodiments.

What is claimed is:

1. A method of using an image sensor and processing circuitry in an electronic device to generate an auto-exposed high-dynamic-range image, the method comprising:
   with the image sensor, capturing a first image;
   with the processing circuitry, generating a first exposure time and a second exposure time based on the captured first image, wherein generating the first exposure time and the second exposure time comprises generating statistics associated with the captured first image and determining an exposure level of the captured first image based on the generated statistics, and wherein determining the exposure level of the captured first image comprises identifying a target exposure level and a clipping exposure level of the captured first image and computing the exposure level as a linear combination of the target exposure level and the clipping exposure level;
   with the image sensor, capturing a second image having long-exposure image pixel values and short-exposure image pixel values, wherein the long-exposure image pixel values are captured using the first exposure time and wherein the short-exposure image pixel values are captured using the second exposure time;
   with the processing circuitry, generating a long-exposure image and a short-exposure image from the captured second image; and
   with the processing circuitry, generating the auto-exposed high-dynamic-range image using the long-exposure image and the short-exposure image.

2. The method defined in claim 1, wherein generating the statistics associated with the captured first image comprises generating a luma mean value and a luma low point value of the first captured image.

3. The method defined in claim 1, wherein generating the first exposure time and the second exposure time further comprises:
   generating an adjusted exposure level based on the determined exposure level; and
   generating the first exposure time based on the adjusted exposure level.

4. The method defined in claim 3, wherein generating the first exposure time and the second exposure time further comprises:
   determining an exposure ratio based on the generated statistics; and
   generating the second exposure time based on the determined exposure ratio and the first exposure time.

5. The method defined in claim 3, further comprising:
   with the processing circuitry, generating image sensor gain settings based on the adjusted exposure level.

6. The method defined in claim 5, wherein capturing the second image comprises capturing the second image using the generated image sensor gain settings.

7. The method defined in claim 1, wherein the captured first image includes initial long-exposure image pixel values and initial short-exposure image pixel values and wherein capturing the first image comprises:
   capturing the initial long-exposure image pixel values using an initial long-exposure time that is different from the first exposure time.

8. The method defined in claim 7, wherein capturing the first image further comprises:
   capturing the initial short-exposure image pixel values using an initial short-exposure time that is different from the second exposure time.

9. The method defined in claim 1, wherein generating the long-exposure image and the short-exposure image comprises:
   interpolating the long-exposure image pixel values and the short-exposure image pixel values.

10. A method of using an image sensor and processing circuitry in an electronic device to generate an auto-exposed high-dynamic-range image of a scene, the method comprising:
    with the image sensor, capturing image data from the scene by capturing initial short-exposure image pixel values;
    with the processing circuitry, determining an auto-exposed short integration time and an auto-exposed long integration time based on the image data, wherein determining the auto-exposed short integration time and the auto-exposed long integration time comprises identifying first and second clipping percentages associated with the initial short-exposure image values, wherein the first clipping percentage represents the short-exposure image pixel values that exceed a first threshold value, and wherein the second clipping percentage represents the short-exposure pixel values that exceed a second threshold value that is different than the first threshold value;
    with the image sensor, capturing a first image having long-exposure image pixel values and a second image having short-exposure image pixel values, wherein the short-exposure image pixel values are captured using the auto-exposed short integration time, and wherein the long-exposure image pixel values are captured using the auto-exposed long integration time; and
    with the processing circuitry, generating the auto-exposed high-dynamic-range image using the first and second images.

11. The method defined in claim 10, wherein capturing the image data from the scene comprises:
    capturing initial long-exposure image pixel values using a first integration time that is different from the auto-exposed long integration time; and capturing the initial short-exposure image pixel values using a second integration time that is different from the auto-exposed short integration time.

12. The method defined in claim 11, wherein determining the auto-exposed short integration time and the auto-exposed long integration time comprises:

generating image statistics from the initial long-exposure image pixel values and the initial short-exposure image pixel values.

13. The method defined in claim 12, wherein determining the auto-exposed short integration time and the auto-exposed long integration time further comprises:

determining an exposure level of the captured first image based on the generated statistics;

generating an exposure adjustment level based on the determined exposure level; and generating the auto-exposed long integration time based on the generated exposure adjustment level.

14. The method defined in claim 10, wherein the first threshold value is approximately half of the second threshold value.

\* \* \* \* \*